United States Patent
Chen et al.

(10) Patent No.: US 9,813,723 B2
(45) Date of Patent: Nov. 7, 2017

(54) CONDITIONALLY INVOKING A RESAMPLING PROCESS IN SHVC

(71) Applicant: QUALCOMM Incorporated, San Diego, CA (US)

(72) Inventors: Jianle Chen, San Diego, CA (US); Xiang Li, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 14/266,658

(22) Filed: Apr. 30, 2014

(65) Prior Publication Data

US 2014/0328398 A1    Nov. 6, 2014

Related U.S. Application Data

(60) Provisional application No. 61/819,483, filed on May 3, 2013, provisional application No. 61/887,235, filed on Oct. 4, 2013.

(51) Int. Cl.
*H04N 19/50* (2014.01)
*H04N 19/31* (2014.01)
(Continued)

(52) U.S. Cl.
CPC ............ *H04N 19/31* (2014.11); *H04N 19/33* (2014.11); *H04N 19/587* (2014.11)

(58) Field of Classification Search
CPC ...... H04N 19/70; H04N 19/61; H04N 19/187; H04N 19/33; H04N 19/105; H04N 19/46;
(Continued)

(56) References Cited

U.S. PATENT DOCUMENTS

| 7,787,540 B2 * | 8/2010 | Park .................... H04N 19/105 375/240.12 |
| 2006/0013313 A1 * | 1/2006 | Han .................... H04N 19/176 375/240.21 |

(Continued)

OTHER PUBLICATIONS

Chen J., et al., "SHVC Test Model 1 (SHM 1) Version 3", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1007, Mar. 26, 2013 (Mar. 26, 2013), XP030114421; 42 pages.

(Continued)

*Primary Examiner* — Nathnael Aynalem
(74) *Attorney, Agent, or Firm* — Knobbe, Martens, Olson & Bear, LLP

(57) ABSTRACT

An apparatus for coding video information according to certain aspects includes a memory and a processor. The memory unit is configured to store video information associated with an interlayer reference picture for a current picture to be coded. The processor is configured to: receive information relating to a plurality of interlayer reference offsets that are configured to define a region of a resampled version of the interlayer reference picture, wherein the region is used to generate a prediction of the current picture, and wherein the plurality of interlayer reference offsets include a left offset, a top offset, a right offset, and a bottom offset that are each specified relative to the current picture; determine based at least in part on the plurality of interlayer reference offsets whether to resample the interlayer reference picture; and in response to determining to resample the interlayer reference picture, resample the interlayer reference picture.

19 Claims, 8 Drawing Sheets

(51) Int. Cl.
*H04N 19/587* (2014.01)
*H04N 19/33* (2014.01)

(58) Field of Classification Search
CPC ...... H04N 19/30; H04N 19/59; H04N 19/176; H04N 19/31; H04N 19/597; H04N 19/172; H04N 19/159; H04N 7/0122; H04N 19/34
USPC ........................................ 375/240.01–240.29
See application file for complete search history.

(56) References Cited

U.S. PATENT DOCUMENTS

| | | | | |
|---|---|---|---|---|
| 2006/0209959 | A1* | 9/2006 | Sun | H04N 19/56 375/240.16 |
| 2006/0233249 | A1* | 10/2006 | Park | H04N 19/70 375/240.12 |
| 2007/0031065 | A1* | 2/2007 | Sun | H04N 19/61 382/299 |
| 2007/0116131 | A1* | 5/2007 | Sun | G06T 3/4007 375/240.29 |
| 2007/0189382 | A1* | 8/2007 | Park | H04N 19/105 375/240.08 |
| 2007/0189384 | A1* | 8/2007 | Park | H04N 21/23406 375/240.12 |
| 2007/0189385 | A1 | 8/2007 | Park et al. | |
| 2009/0010331 | A1* | 1/2009 | Jeon | H04N 19/105 375/240.12 |
| 2009/0310680 | A1* | 12/2009 | Jeon | H04N 19/105 375/240.16 |
| 2010/0027619 | A1* | 2/2010 | Doser | H04N 19/30 375/240.02 |
| 2010/0091840 | A1* | 4/2010 | Gao | H04N 19/105 375/240.2 |

OTHER PUBLICATIONS

Deshpande S., et al., "AHG9/ AHG14: On Color Gamut Scalable Video Coding",13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16 ); URL: http://wftp3.itu.int/av-arch/jctvc-site/,,No. JCTVC-M0214, Apr. 9, 2013 (Apr. 9, 2013), XP030114171; 6 pages.

International Search Report and Written Opinion—PCT/US2014/036421—ISA/EP—dated Jul. 17, 2014.

Ramasubramonian A. K., et al., "Signaling of extended spatial scalability for SHVC", 13. JCT-VC Meeting; 104. MPEG Meeting;Apr. 18, 2013-Apr. 26, 2013; Incheon, Korea (Joint Collaborative Team on Video Coding of ISO/IEC JTC1/SC29/WG11 and ITU-T SG.16);URL: http://wftp3.itu.int/av-arch/jctvc-site/, No. JCTVC-M0309, Apr. 9, 2013 (Apr. 9, 2013), XP030114266; 4 Pages.

Kwon D-K., et al., "Inter-layer texture prediction for bit-depth and chroma format scalability", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16 ); URL: http://wftp3.itu.int/av-arch/jctvc-site/ , No. JCTVC-L0229, Jan. 8, 2013 (Jan. 8, 2013), 8 pages; XP030113717.

* cited by examiner

CONDITIONALLY INVOKING A RESAMPLING PROCESS IN SHVC

CROSS REFERENCE TO RELATED APPLICATIONS

This application claims the benefit of U.S. Provisional Application No. 61/819,483, filed May 3, 2013, and U.S. Provisional Application No. 61/887,235, filed Oct. 4, 2013, each of which is incorporated by reference in its entirety.

BACKGROUND

Field

This disclosure is related to the field of video coding and compression. In particular, it is related to scalable video coding (SVC), including SVC for Advanced Video Coding (AVC), as well as SVC for High Efficiency Video Coding (HEVC), which is also referred to as Scalable HEVC (SHVC). It is also related to 3D video coding, such as the multiview extension of HEVC, referred to as MV-HEVC. Various embodiments relate to systems and methods for improved inter-layer prediction signaling and related processes (e.g., derivation of inter-layer reference picture sets, derivation of reference picture lists, etc.).

Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to scalable video coding (SVC). Various techniques described below provide describe methods and devices for determining whether to resample interlayer reference pictures.

An apparatus for coding video information according to certain aspects includes a memory and a processor operationally coupled to the memory. The memory unit is configured to store video information associated with an inter-layer reference picture for a current picture to be coded. The processor is configured to: receive information relating to a plurality of interlayer reference offsets that are configured to define a region of a resampled version of the interlayer reference picture, wherein the region is used to generate a prediction of the current picture, and wherein the plurality of interlayer reference offsets include a left offset, a top offset, a right offset, and a bottom offset that are each specified relative to the current picture; determine based at least in part on the plurality of interlayer reference offsets whether to resample the interlayer reference picture; and in response to determining to resample the interlayer reference picture, resample the interlayer reference picture.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
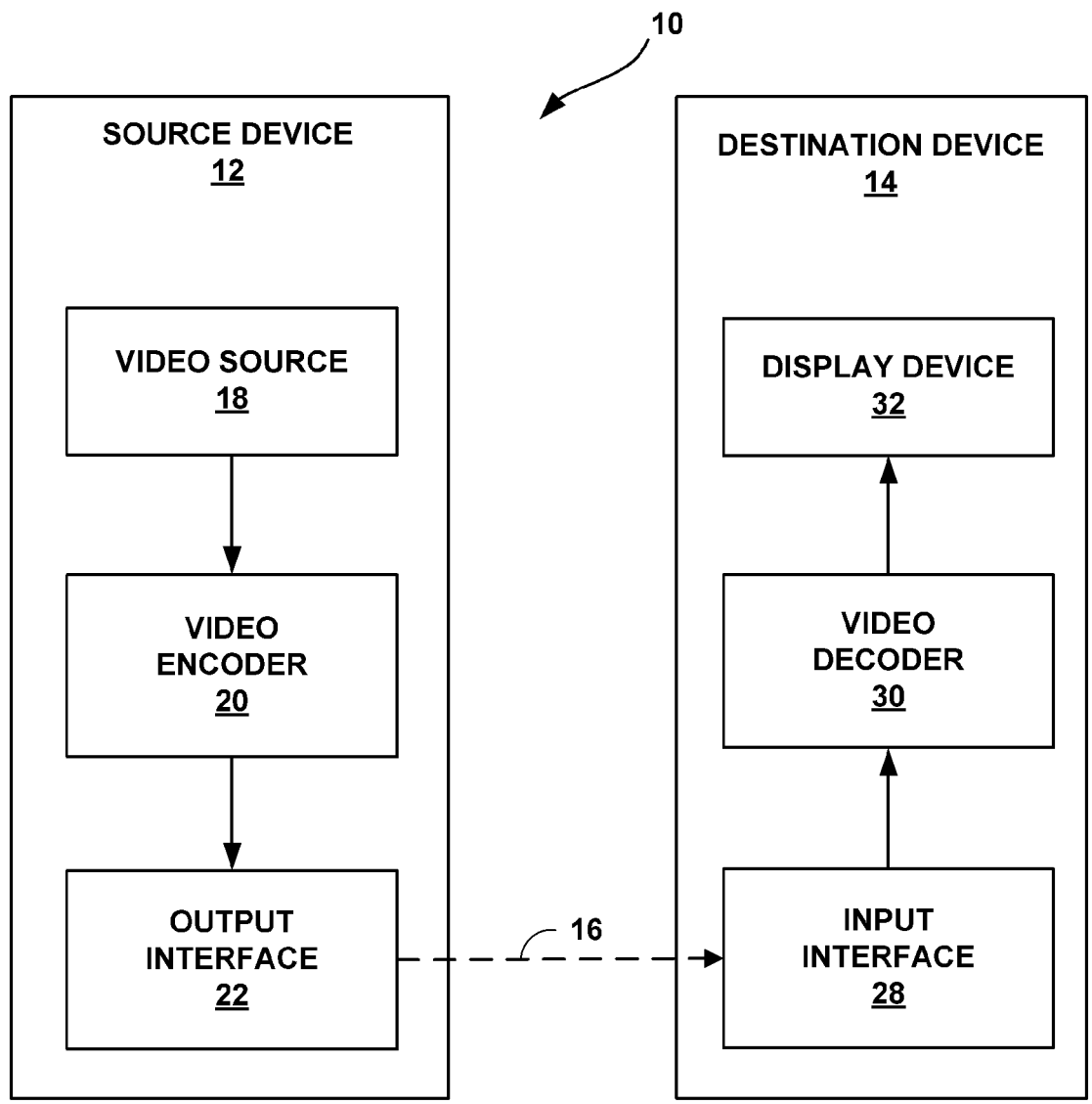
FIG. 1 is a block diagram illustrating an example video encoding and decoding system that may utilize techniques in accordance with aspects described in this disclosure.

The techniques described in this disclosure generally relate to scalable video coding (SHVC, SVC) and multiview/3D video coding (e.g., multiview coding plus depth, MVC+D). For example, the techniques may be related to, and used with or within, a High Efficiency Video Coding (HEVC) scalable video coding (SVC, sometimes referred to as SHVC) extension. In an SHVC, SVC extension, there could be multiple layers of video information. The layer at the lowest level of the video information may serve as a base layer (BL) or reference layer (RL), and the layer at the very top (or the highest layer) of the video information may serve as an enhanced layer (EL). The "enhanced layer" is sometimes referred to as an "enhancement layer," and these terms may be used interchangeably. The base layer is sometimes referred to as a "reference layer," and these terms may also be used interchangeably. All layers in between the base layer and the top layer may serve as additional ELs and/or reference layers. For example, a given layer may be an EL for a layer below (e.g., that precedes) the given layer, such as the base layer or any intervening enhancement layer. Further, the given layer may also serve as a RL for one or more the enhancement layer(s) above (e.g., subsequent to) the given layer. Any layer in between the base layer (e.g., the lowest layer having, for example, a layer identification (ID) set or equal to "1") and the top layer (or the highest layer) may be used as a reference for inter-layer prediction by a layer higher to the given layer and may use a layer lower to the given layer as a reference for inter-layer prediction. For example, the given layer can be determined using a layer lower to the given layer as a reference for inter-layer prediction.

For simplicity, examples are presented in terms of just two layers: a BL and an EL; however, it should be well understood that the ideas and embodiments described below are applicable to cases with multiple layers, as well. In addition, for ease of explanation, the terms "frames" or "blocks" are often used. However, these terms are not meant to be limiting. For example, the techniques described below can be used with any of a variety of video units, including but not limited to pixels, blocks (e.g., CU, PU, TU, macroblocks, etc.), slices, frames, picture, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) and Multi-view Coding plus Depth (MVC+D) extensions. The latest HEVC draft specification, and referred to as HEVC WD10 hereinafter, is available from http://phenix.int-evry.fr/jct/doc_end_user/documents/ 12_Geneva/wg11/JCTVC-L1003-v34.zip. The multiview extension to HEVC, namely MV-HEVC, is also being developed by the JCT-3V. A recent Working Draft (WD) of MV-HEVC WD3 hereinafter, is available from http:// phenix.it-sudparis.eu/jct2/doc_end_user/documents/3_Geneva/wg11/JCT3VC1004-v4.zip. The scalable extension to HEVC, named SHVC, is also being developed by the JCT-VC. A recent Working Draft (WD) of SHVC and referred to as SHVC WD1 hereinafter, is available from http://phenix.int-evry.fr/jct/doc_end_user/documents/ 12_Geneva/wg11/JCTVC-L1008-v1.zip.

In SVC and SHVC, video information may be provided as multiple layers. The layer at the very bottom level can just serve as a base layer (BL) and the layer at the very top level can serve as an enhancement layer (EL). All the layers between the top and bottom layers may serve as both enhancement layers and reference layers. For example, a layer in the middle can be an EL for the layers below it, and at the same time as a RL for the layers above it. For simplicity of description, we can assume that there are two layers, a BL and an EL, in illustrating the techniques described below. However, all the techniques described herein are applicable to cases with multiple (more than two) layers, as well.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC, which refers to the SVC extension for H.264 or the SHVC extension for H.265 (as discussed above), prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information (including motion vectors) of the base layer to predict motion in the enhancement layer. Inter-layer residual prediction uses the residue of the base layer to predict the residue of the enhancement layer.

Overview

In High-Level Syntax Only SHVC, changes to syntax are only allowed at a slice or above level. For example, SHVC high-level syntax design has been proposed in such a way that the collocated reconstructed pictures (resampled if necessary) from the reference layers (e.g., reference layer pictures with the same picture order count (POC) value as that of the current picture) can be used as inter-layer reference pictures when coding the current enhancement layer picture. This can allow inter-layer prediction to be carried out without any low level coding process changes.

Therefore, the whole reference picture from a different layer may need to be upsampled or resampled since block-level resampling may not be available. A reference picture from another layer may be referred to as an "interlayer reference picture." In interlayer prediction, the prediction of the current picture may be generated based on the interlayer reference picture. However, only a portion or region of the interlayer reference picture may be used in generating the prediction for the current picture. The region can be defined in terms of an upsampled or resampled version of the interlayer reference picture. For example, SHVC can use scaled reference layer offsets, which may be offsets that indicate, relative to the current picture, the region of the upsampled or resampled interlayer reference picture used in prediction. Scaled reference layer offsets are explained in more detail below.

The early versions of SHVC working draft uses only the picture size to determine whether an interlayer reference picture should be resampled. However, since only a portion (e.g., a region) of the interlayer reference picture (or the upsampled or resampled interlayer reference picture) may be used in predicting the current picture, considering only the picture size may not be sufficient. Also, the SHVC may also support the bit depth scalability, e.g., the reference layer and enhancement layer may have different bit depths. The resampling process may also need to be invoked when the reference layer and enhancement layer have the same picture size but differ in bit depths.

In order to address these and other issues, the techniques described in this disclosure define condition(s) for invoking the resampling process for an interlayer reference picture that consider the scaled reference layer offsets. In some embodiments, the condition can be based on spatial resolution and the scaled reference layer offsets. In other embodiments, the conditions can be based on spatial resolution, chroma format, bit depth, and the scaled reference layer offsets. By incorporating the scaled reference layer offsets in determining whether to resample the interlayer reference picture, the techniques can resample the interlayer reference picture appropriately when only a portion of the interlayer reference picture is used for interlayer prediction. If the scaled reference layer offsets are not considered in determining whether to resample the interlayer reference picture, the resampling process may not be invoked in cases where the interlayer reference picture should be resampled (e.g., the interlayer reference picture has the same picture size, but the scaled reference layer offsets indicate that only a portion of the interlayer reference picture is used, and the resampling process should be invoked to have correct inter-layer prediction). Considering the scaled reference layer offsets can lead to improved accuracy in identifying when the interlayer reference picture should be resampled, and therefore can lead to better prediction results since appropriately resampled interlayer reference pictures may be used in prediction.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 can provide the video data to the destination device 14 via a communication channel 16, which may include a computer-readable storage medium or other communication channel. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via communication channel 16. Communication channel 16 may comprise a type of medium or device capable of moving the encoded video data from source device 12 to destination device 14. For example, communication channel 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. In such examples, channel 16 may correspond to a storage device or computer-readable storage medium that stores the encoded video data generated by source device 12. For example, destination device 14 may access the computer-readable storage medium via disk access or card access. Similarly, encoded data may be accessed from the computer-readable storage medium by input interface 28. The computer-readable storage medium may include any of a variety of distributed or locally accessed data storage media such as a hard drive, Blu-ray discs, DVDs, CD-ROMs, flash memory, volatile or non-volatile memory, or other digital storage media for storing video data. The computer-readable storage medium may correspond to a file server or another intermediate storage device that may store the encoded video generated by source device 12. Destination device 14 may access stored video data from the computer-readable storage medium via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the computer-readable storage medium may be a streaming transmission, a download transmission, or a combination of both.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a communication channel 16, which may include a computer-readable storage medium, as discussed above.

Computer-readable storage medium may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, communication channel 16 may be understood to include one or more computer-readable storage media of various forms.

Input interface 28 of destination device 14 can receive information from communication channel 16. The information of communication channel 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard and its extension and Version 1 has been finalized. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2A:
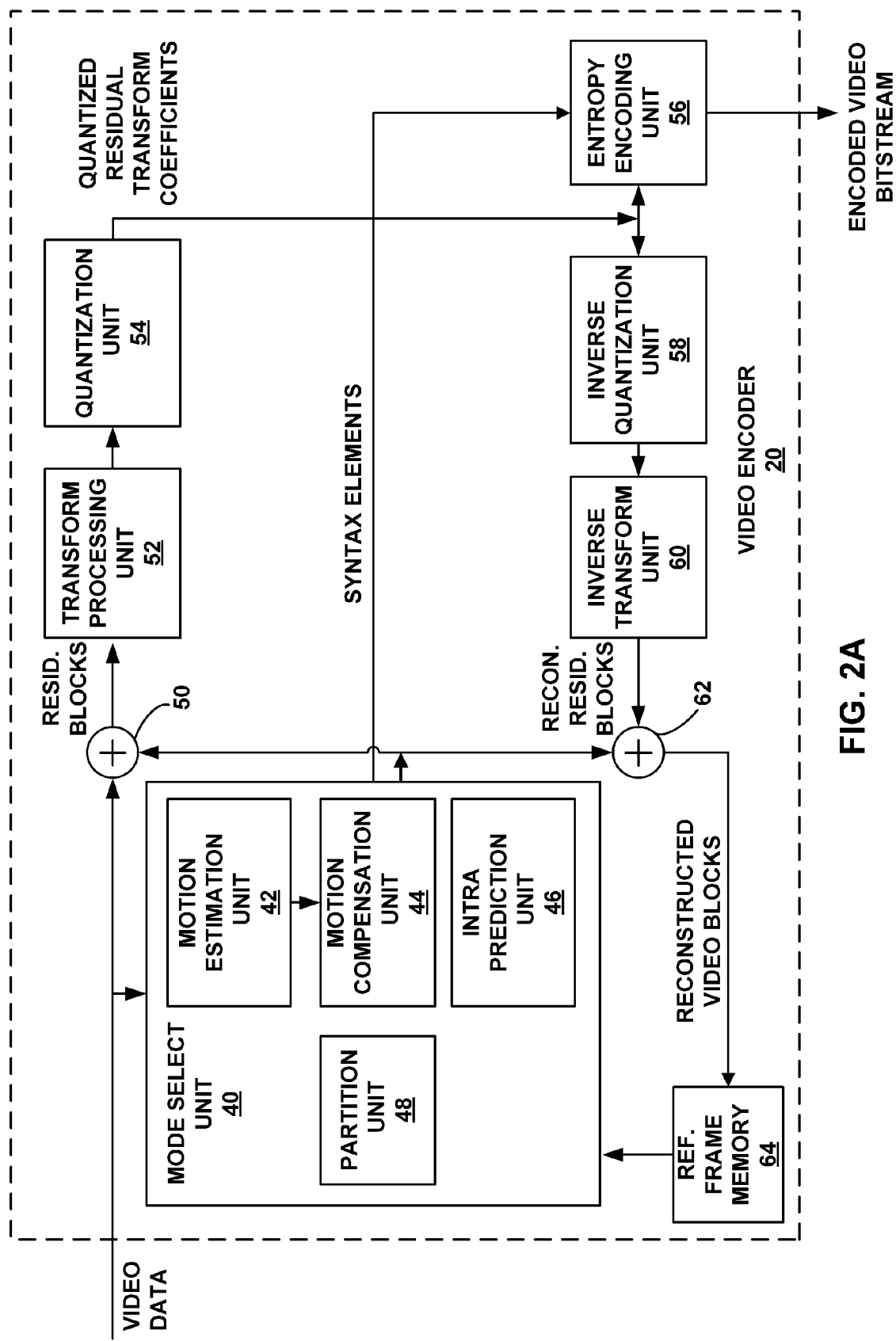
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video bitstream, such as for HEVC. Further, video encoder 20 may be configured to perform any or all of the techniques of this disclosure, including but not limited to the methods of performing inter-layer prediction signaling and related processes described in greater detail above and below with respect to FIGS. 4-6. As one example, inter-layer prediction unit 66 (when provided) may be configured to perform any or all of the techniques described in this disclosure. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The encoder 20 of FIG. 2A illustrates a single layer of a codec. However, as will be described further with respect to FIG. 2B, some or all of the video encoder 20 may be duplicated for processing according to a multi-layer codec.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2A, video encoder 20 receives a current video block within a video frame to be encoded. In the example of FIG. 2A, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48. Reference frame memory 64 may include a decoded picture buffer. The decoded picture buffer is a broad term having its ordinary meaning, and in some embodiments refers to a video codec-managed data structure of reference frames.

For video block reconstruction, video encoder 20 also includes inverse quantization unit 58, inverse transform unit 60, and summer 62. A deblocking filter (not shown in FIG. 2A) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping using a temporal scaling function may be performed by the inter-layer prediction unit 66, as described in greater detail below.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Multi-Layer Video Encoder

Figure 2B:
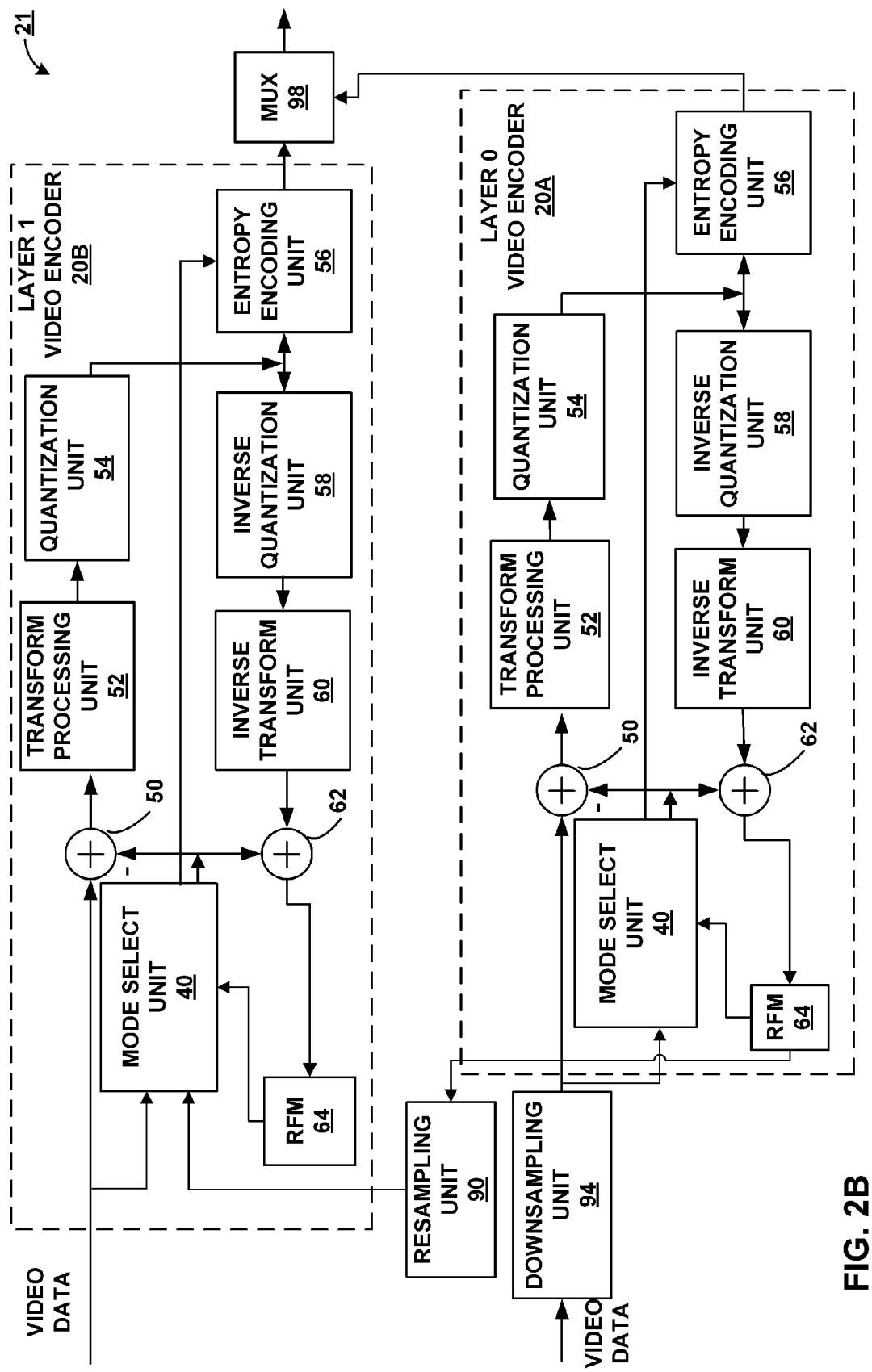
FIG. 2B is a block diagram illustrating an example of a video encoder that may implement techniques in accordance with aspects described in this disclosure.

FIG. 2B is a block diagram illustrating an example of a multi-layer video encoder 21 that may implement techniques in accordance with aspects described in this disclosure. The video encoder 21 may be configured to process multi-layer video frames, such as for SHVC and multiview coding. Further, the video encoder 21 may be configured to perform any or all of the techniques of this disclosure.

The video encoder 21 includes a video encoder 20A and video encoder 20B, each of which may be configured as the video encoder 20 of FIG. 2A and may perform the functions described above with respect to the video encoder 20. Further, as indicated by the reuse of reference numbers, the video encoders 20A and 20B may include at least some of the systems and subsystems as the video encoder 20. Although the video encoder 21 is illustrated as including two video encoders 20A and 20B, the video encoder 21 is not limited as such and may include any number of video encoder 20 layers. In some embodiments, the video encoder 21 may include a video encoder 20 for each picture or frame in an access unit. For example, an access unit that includes five pictures may be processed or encoded by a video encoder that includes five encoder layers. In some embodiments, the video encoder 21 may include more encoder layers than frames in an access unit. In some such cases, some of the video encoder layers may be inactive when processing some access units.

In addition to the video encoders 20A and 20B, the video encoder 21 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the mode select unit 40 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled. Resampling unit 90 may be further configured to perform cropping and/or padding operations, as well.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the mode select unit 40 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 64 of the video encoder 20A may be provided directly, or at least without being provided to the resampling unit 90, to the mode select unit 40 of the video encoder 20B. For example, if video data provided to the video encoder 20B and the reference picture from the decoded picture buffer 64 of the video encoder 20A are of the same size or resolution, the reference picture may be provided to the video encoder 20B without any resampling.

In some embodiments, the video encoder 21 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 21 may further include a multiplexor 98, or mux. The mux 98 can output a combined bitstream from the video encoder 21. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 21, such as from a processor on the source device 12. The control signal may be generated based on the resolution or bitrate of a video from the video source 18, based on a bandwidth of the channel 16, based on a subscription associated with a user (e.g., a paid subscription versus a free subscription), or based on any other factor for determining a resolution output desired from the video encoder 21.

Video Decoder

Figure 3A:
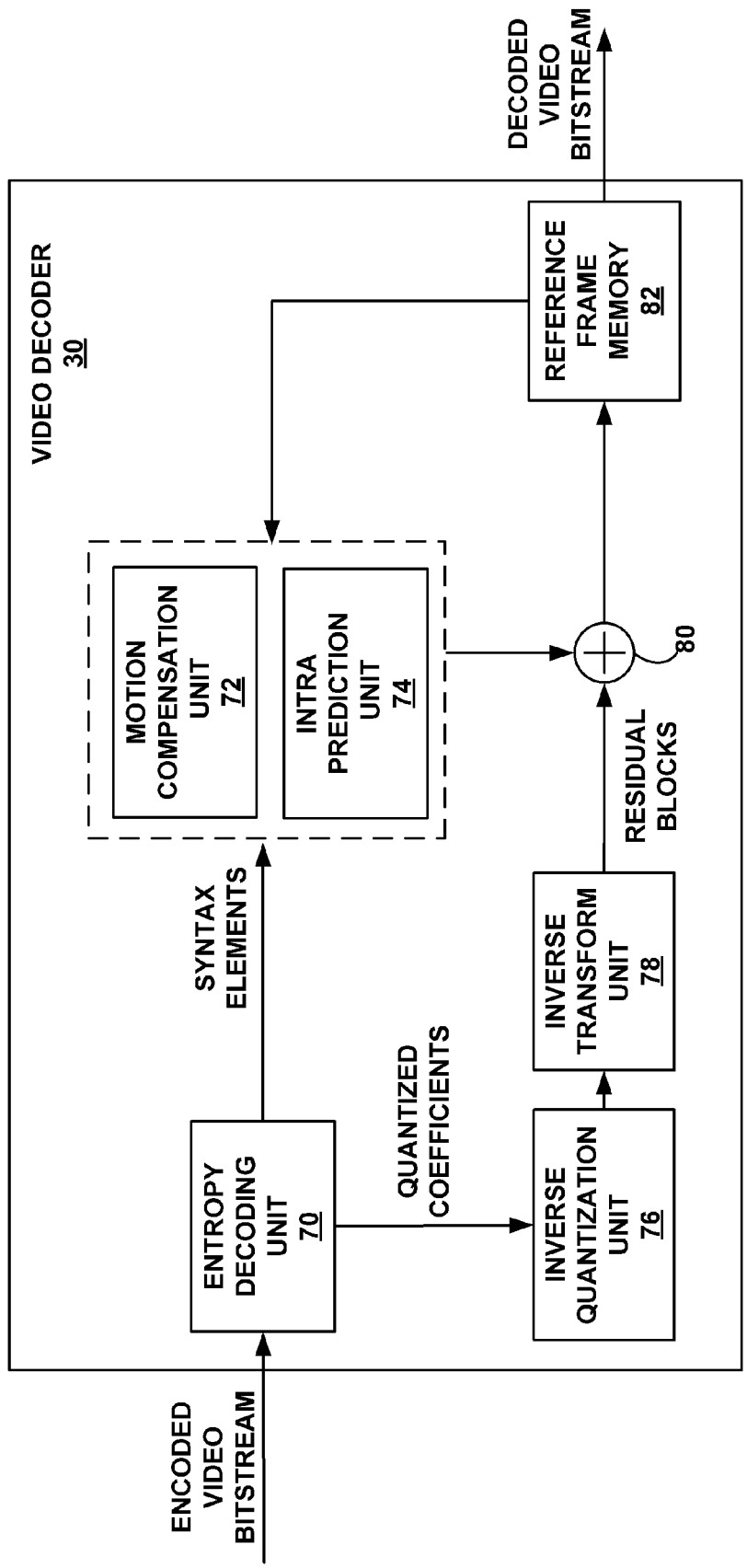
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video bitstream, such as for HEVC. Further, video decoder 30 may be configured to perform any or all of the techniques of this disclosure, including but not limited to the methods of conditionally invoking resampling process and related processes described in greater detail above and below with respect to FIGS. 4-6. As one example, inter-layer prediction unit 75 may be configured to perform any or all of the techniques described in this disclosure. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The decoder 30 of FIG. 3A illustrates a single layer of a codec. However, as will be described further with respect to FIG. 3B, some or all of the video decoder 30 may be duplicated for processing according to a multi-layer codec.

In the example of FIG. 3A, video decoder 30 includes an entropy decoding unit 70, motion compensation unit 72, intra prediction unit 74, inter-layer prediction unit 75, inverse quantization unit 76, inverse transformation unit 78, reference frame memory 82 and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2A). Motion compensation unit 72 may generate prediction data based on motion vectors received from entropy decoding unit 70, while intra-prediction unit 74 may generate prediction data based on intra-prediction mode indicators received from entropy decoding unit 70. Reference frame memory 82 may include a decoded picture buffer. The decoded picture buffer is a broad term having its ordinary meaning, and in some embodiments refers to a video codec-managed data structure of reference frames.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping may be performed by the inter-layer prediction unit 75 using a temporal scaling function, as described in greater detail below.

Inverse quantization unit 76 inverse quantizes, e.g., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Multi-Layer Decoder

Figure 3B:
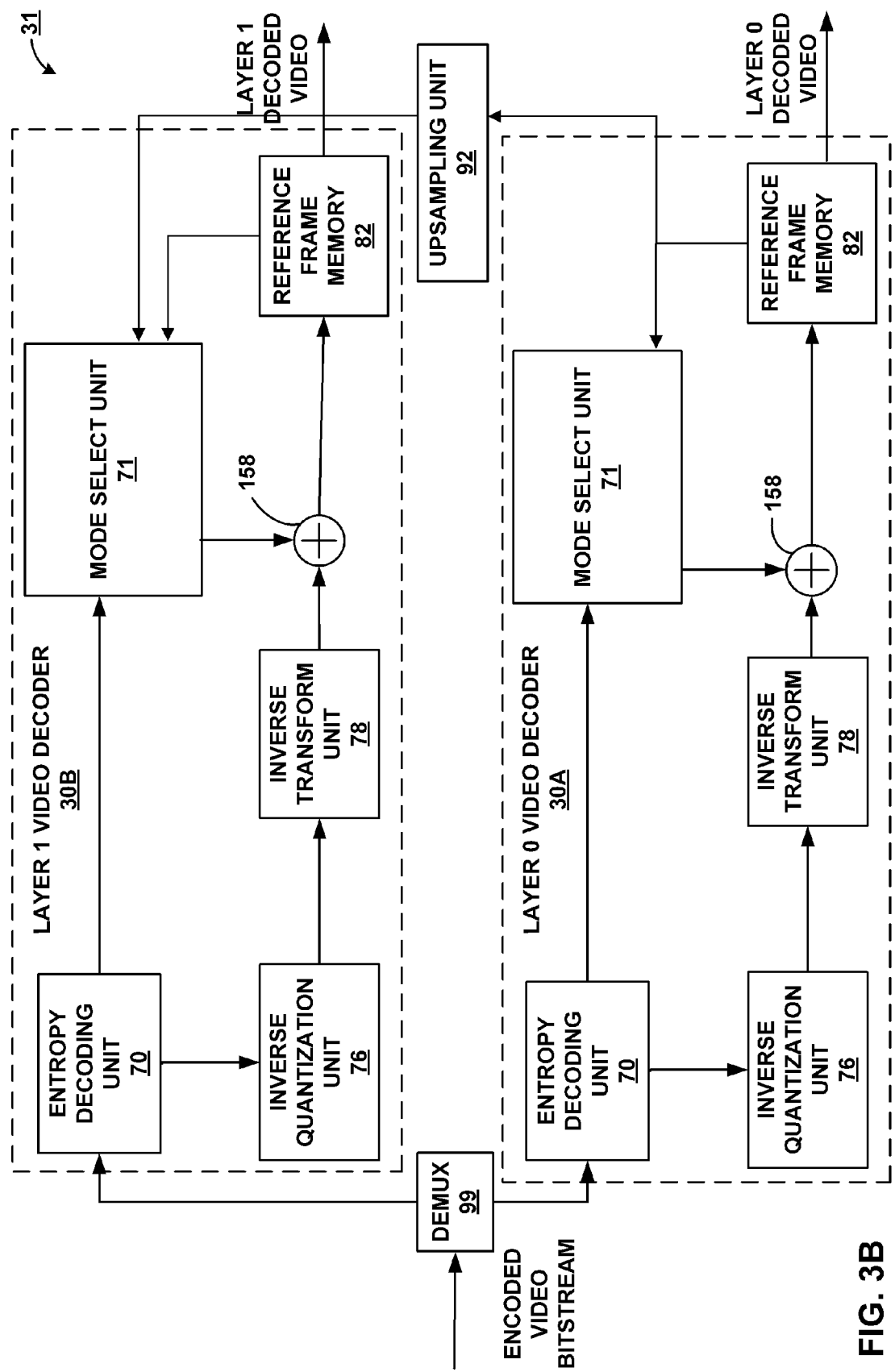
FIG. 3B is a block diagram illustrating an example of a video decoder that may implement techniques in accordance with aspects described in this disclosure.

FIG. 3B is a block diagram illustrating an example of a multi-layer video decoder 31 that may implement techniques in accordance with aspects described in this disclosure. The video decoder 31 may be configured to process multi-layer video frames, such as for SHVC and multiview coding. Further, the video decoder 31 may be configured to perform any or all of the techniques of this disclosure.

The video decoder 31 includes a video decoder 30A and video decoder 30B, each of which may be configured as the video decoder 30 of FIG. 3A and may perform the functions described above with respect to the video decoder 30. Further, as indicated by the reuse of reference numbers, the video decoders 30A and 30B may include at least some of the systems and subsystems as the video decoder 30. Although the video decoder 31 is illustrated as including two video decoders 30A and 30B, the video decoder 31 is not limited as such and may include any number of video decoder 30 layers. In some embodiments, the video decoder 31 may include a video decoder 30 for each picture or frame in an access unit. For example, an access unit that includes five pictures may be processed or decoded by a video decoder that includes five decoder layers. In some embodiments, the video decoder 31 may include more decoder layers than frames in an access unit. In some such cases, some of the video decoder layers may be inactive when processing some access units.

In addition to the video decoders 30A and 30B, the video decoder 31 may include an upsampling unit 92. In some embodiments, the upsampling unit 92 may upsample a base layer of a received video frame to create an enhanced layer to be added to the reference picture list for the frame or access unit. This enhanced layer can be stored in the reference frame memory 82 (e.g., in its decoded picture buffer, etc.). In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 82 of the lower layer decoder (e.g., the video decoder 30A) and to upsample the picture (or the received picture information). This upsampled picture may then be provided to the mode select unit 71 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 82 of the video decoder 30A may be provided directly, or at least without being provided to the upsampling unit 92, to the mode select unit 71 of the video decoder 30B. For example, if video data provided to the video decoder 30B and the reference picture from the decoded picture buffer 82 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 82 of the video decoder 30A.

As illustrated in FIG. 3B, the video decoder 31 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 31, such as from a processor on the destination device 14. The control signal may be generated based on the resolution or bitrate of a video from the input interface 28, based on a bandwidth of the channel 16, based on a subscription associated with a user (e.g., a paid subscription versus a free subscription), or based on any other factor for determining a resolution obtainable by the video decoder 31. Picture Aspect Ratio (PAR) and Picture Sample Aspect Ratio (PSAR)

Figure 4:
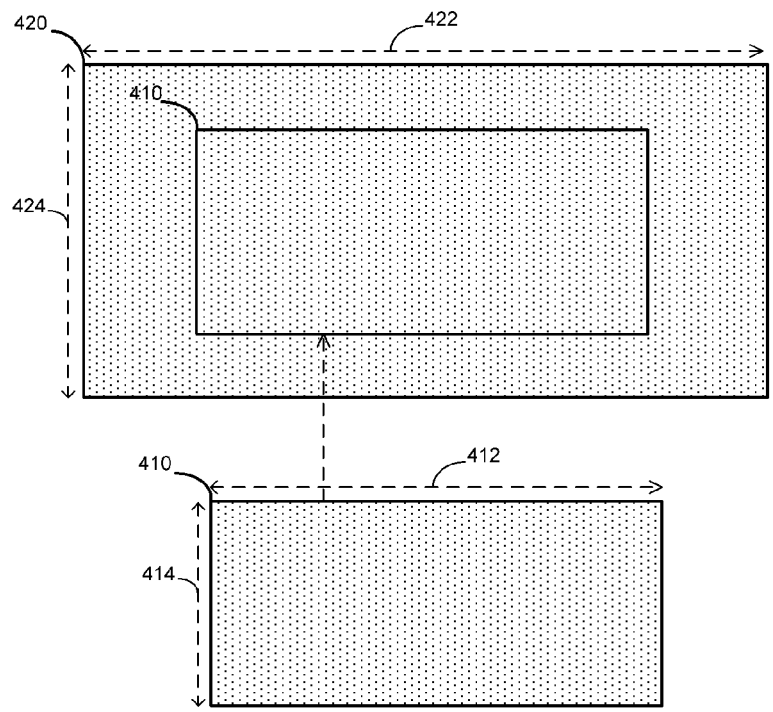
FIG. 4 is a diagram illustrating an example of picture aspect ratio scalability between a reference layer and an enhancement layer.

FIG. 4 illustrates a conceptual diagram of an example of picture aspect ratio scalability between a reference layer and an enhancement layer. In some embodiments, Picture Aspect Ratio (PAR) is the width:height ratio of a picture, where width and height are measured in the same length (spatial measurement) units. Picture aspect ratio may be expressed as X:Y, where X is horizontal width and Y is vertical height (in arbitrary units of spatial distance). In some embodiments, Picture Sample Aspect Ratio (PSAR) is the ratio between the horizontal distance between the columns and the vertical distance between the rows of the luma sample array in a picture. Picture sample aspect ratio may be expressed as h:v, where h is horizontal width and v is vertical height (in arbitrary units of spatial distance). FIG. 4 illustrates an example in which PSAR is the same between a reference layer and an enhancement layer, and the reference layer is a cropped version of the enhancement layer. In particular, as shown, a reference layer 410 can comprise a horizontal width 412 and a vertical height 414. For example, the horizontal width 412 may be 853 pixels and the vertical height 414 may be 480 pixels. An enhancement layer 420 can comprise a horizontal width 422 and a vertical height 424. For example, the horizontal width 422 may be 1280 pixels and the vertical height 424 may be 720 pixels. In this figure, the spatial resolution of the enhancement layer 420 is 1280×720, and the spatial resolution of the reference layer 410 is 853×480 (WVGA). Both the reference layer 410 and enhancement layer 420 have PSAR of 1. In this example, both the reference layer 410 and enhancement layer 420 have a PAR of 16:9.

Figure 5:
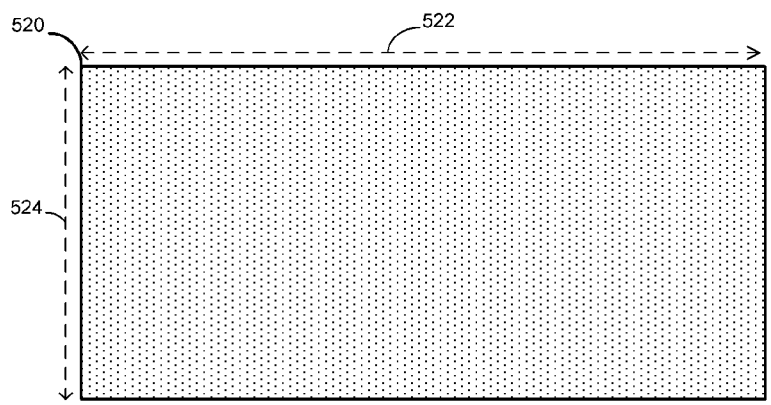
FIG. 5 is a diagram illustrating another example of picture aspect ratio scalability between a reference layer and an enhancement layer.
Figure 5:
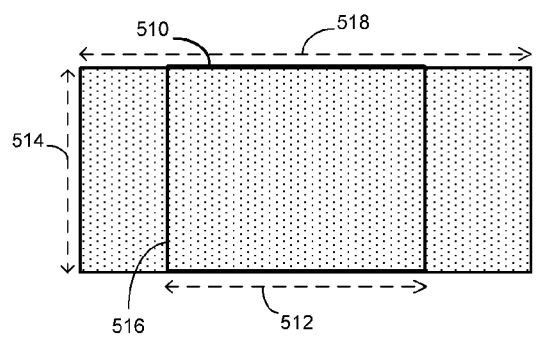

FIG. 5 illustrates a conceptual diagram of another example of picture aspect ratio scalability between a reference layer and an enhancement layer. FIG. 5 illustrates an example in which PSAR is the same between a reference layer and an enhancement layer, and the reference layer is a scaled and cropped version of the enhancement layer. In particular, as shown, a reference layer 510 can comprise a horizontal width 512 and a vertical height 514. For example, the horizontal width 512 may be 640 pixels and the vertical height 514 may be 480 pixels. An enhancement layer 520 can comprise a horizontal width 522 and a vertical height 524. For example, the horizontal width 522 may be 1280 pixels and the vertical height 524 may be 720 pixels. The reference layer 510 may be scaled, and it is possible part of the scaled region is used for to predict the enhancement layer 520. In FIG. 5, the spatial resolution of the enhancement layer is 1280×720 (PAR 16:9) and of the reference layer is 640×480 (PAR 4:3), and both the layers have PSAR of 1. In the illustrated embodiment of FIG. 5, the enhancement layer 520 has a different picture aspect ratio than the reference layer 510.

HEVC/SHVC

In SHVC, the regions of the upsampled base layer picture that are to be used for inter-layer prediction may also be defined in the sequence parameter set, VPS, or slice header. Further details relating to defining and/or signaling such regions can be found in U.S. Provisional Application No. 61/773,102, filed Mar. 5, 2013, and U.S. application Ser. No. 14/194,159, filed Feb. 28, 2014, each of which is incorporated herein by reference in its entirety. Following are examples of the syntax signaled in SHVC working draft:

scaled_ref_layer_left_offset specifies the horizontal offset between the upper-left luma sample of a resampled layer picture used for inter-layer prediction and the upper-left luma sample of the current picture in units of two luma samples. When not present, the value of seq_scaled_ref_layer_left_offset is inferred to be equal to 0.

scaled_ref_layer_top_offset specifies the vertical offset between the upper-left luma sample of a resampled layer picture used for inter-layer prediction and the upper-left luma sample of the current picture in units of two luma samples. When not present, the value of seq_scaled_ref_layer_top_offset is inferred to be equal to 0.

scaled_ref_layer_right_offset specifies the horizontal offset between the bottom-right luma sample of a resampled layer picture used for inter-layer prediction and the bottom-right luma sample of the current picture in units of two luma samples. When not present, the value of seq_scaled_ref_layer_right_offset is inferred to be equal to 0.

scaled_ref_layer_bottom_offset specifies the vertical offset between the bottom-right luma sample of a resampled layer picture used for inter-layer prediction and the bottom-right luma sample of the current picture in units of two luma samples. When not present, the value of seq_scaled_ref_layer_bottom_offset is inferred to be equal to 0.

High Level Syntax (HLS) Change Only SHVC

To support inter-layer prediction in SHVC, a reference layer picture (resampled when necessary) may be put in a reference picture list of the enhancement current picture as a reference picture. In the case of spatial scalability, the reconstructed base layer picture may need to be upsampled to match the enhancement layer picture size. The resampling process can include an up-sampling process and a padding and/or cropping process as described, for example, in U.S. Provisional Application No. 61/773,102, filed Mar. 5, 2013, and U.S. application Ser. No. 14/194,159, filed Feb. 28, 2014, mentioned above.

Conditionally Invoking a Resampling Process in SHVC

In SHVC, when a reference layer picture (e.g., a reconstructed reference layer picture) is added as a reference picture in a reference picture list of the current picture, a resampling process (e.g., upsampling or downsampling) may be performed on the reconstructed reference layer picture to generate an interlayer reference picture having the same size as the current picture. If the resampling process is not necessary (e.g., if the reconstructed reference layer picture is the same size as the current picture, etc.), the reconstructed reference layer picture can be directly added to the reference picture list of the current picture. Otherwise, the resampled process is invoked to generate a new interlayer reference picture to be added to the reference picture list of the current picture.

The early versions of SHVC working draft simply use the picture size to determine whether the resampling process needs to be invoked to form an interlayer reference picture. However, with the scaled reference offsets signaled as described above (e.g., scaled_ref_layer_left_offset, scaled_ref_layer_top_offset, scaled_ref_layer_right_offset, scaled_ref_layer_bottom_offset), the condition defined in the early versions of SHVC working draft is no longer sufficient. For example, if the picture size of the current picture and the interlayer reference picture are the same (and therefore under the current SHVC working draft procedures, resampling would not be employed), if only a region of the interlayer reference picture is used for interlayer prediction, the region of the interlayer reference picture should be resampled, even though the picture sizes of the current picture and the interlayer reference picture are the same.

According to some embodiments, new conditions are defined and used as the "trigger" (the basis) to invoke the resampling process. The techniques described in the disclosure can take into consideration the scaled reference layer offsets as well as spatial resolutions in determining whether an interlayer reference picture should be resampled. The resampling process can include upsampling, downsampling, bit-shifting, cropping, and/or padding of the interlayer reference picture, as appropriate. In some embodiments, the condition can be based on spatial resolution and the scaled reference layer offsets. In other embodiments, the conditions can be based on spatial resolution, chroma format, bit depth, and the scaled reference layer offsets.

As defined in HEVC/SHVC, a reference picture of a current picture must have the same spatial ratio and picture size as that of the current picture. Also, in SHVC, there is a normative bitstream conforming constraint that motion vector of the interlayer reference picture shall be zero. Therefore, according to various embodiments, the interlayer reference picture of the current picture in SHVC should have the following features:

The interlayer reference picture should have the same spatial ratio as the current picture, The interlayer reference picture should have the same picture size as the current picture, The collocated samples of the reference layer picture and the current picture should be located at the same sample position.

If a reference layer picture has all the above mentioned three features, the reconstructed reference layer picture can be directly added to the reference picture list of the current picture. Otherwise, the resampling process is invoked to generate an interlayer reference picture to be added to the reference picture list of the current picture. In some embodiments, the techniques can define conditions for invoking the resampling process in a manner such that the interlayer reference picture is resampled when any of the above three features are not met. Certain details relating to the techniques are described below with reference to FIG. 6.

Figure 6:
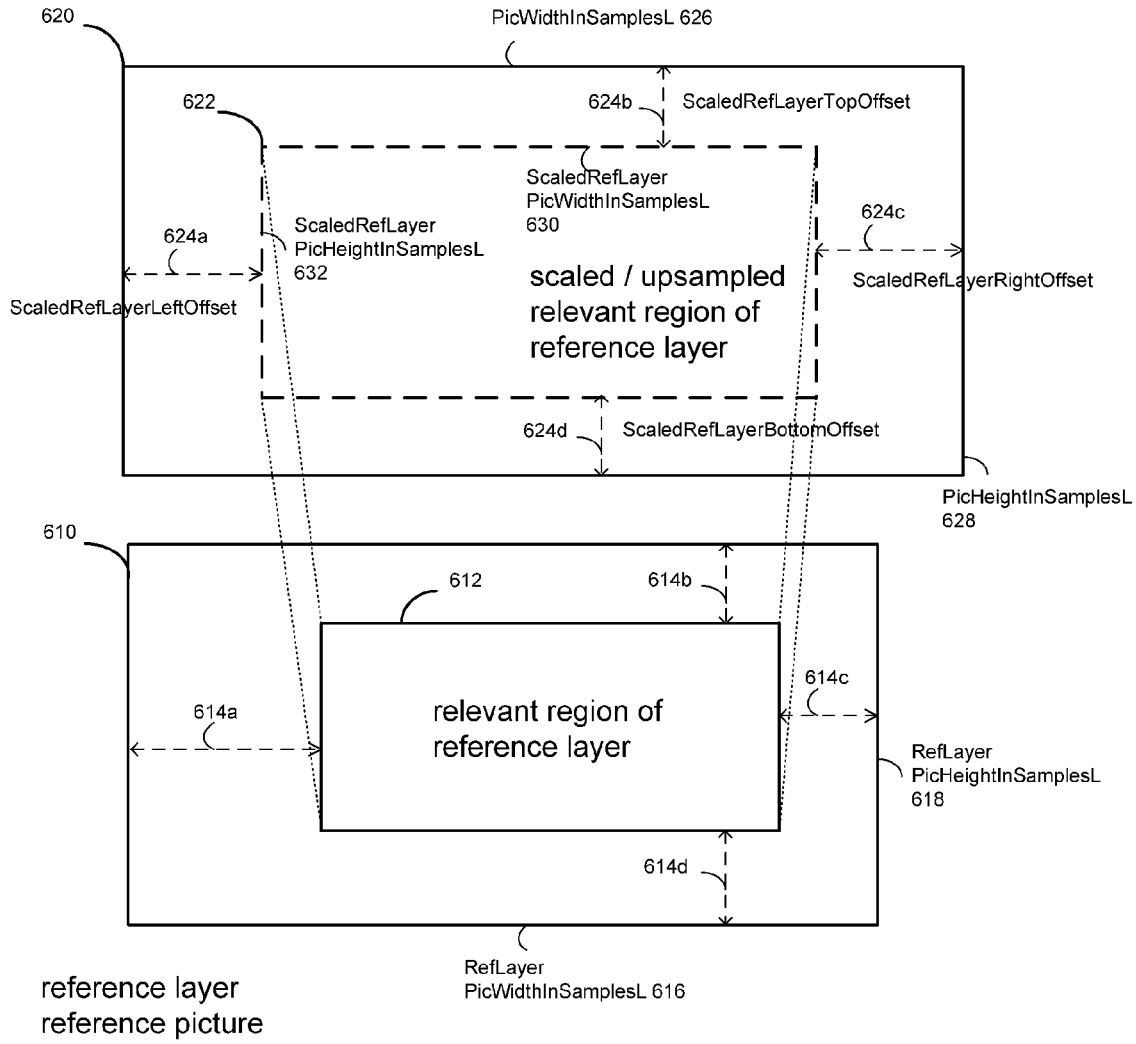
FIG. 6 is a block diagram illustrating an example conditions for invoking the resampling process, according to aspects of the disclosure.

FIG. 6 is a block diagram illustrating example conditions for invoking the resampling process, according to aspects of the disclosure. Various term used throughout this disclosure are broad terms having their ordinary meaning. In addition, in some embodiments, certain terms relate to the following video concepts. A picture can refer to video picture as that term is used in current standards (e.g., HEVC). An offset can refer to a distance or a difference between two points, two lines, two edges, two surfaces, two areas, two elements, two objects (e.g., pictures, etc.), etc. In some embodiments, an offset may refer to a spacing between two boundaries, such as the offsets 624 illustrated in FIG. 6. For example, the left offset 624*a* is the spacing between the left boundary of the enhancement layer current picture 620 and the left boundary of the scaled/upsampled relevant region of the reference layer 622; the top offset 624*b* is the spacing between the top boundary of the enhancement layer current picture 620 and the top boundary of the scaled/upsampled relevant region of the reference layer 622; the right offset 624*c* is the spacing between the right boundary of the enhancement layer current picture 620 and the right boundary of the scaled/upsampled relevant region of the reference layer 622; and the bottom offset 624*d* is the spacing between the bottom boundary of the enhancement layer current picture 620 and bottom left boundary of the scaled/upsampled relevant region of the reference layer 622. In certain embodiments, an offset may be specified relative to a reference point, line, boundary, etc. In the example of FIG. 6, the left offset 624*a*, the top offset 624*b*, the right offset 624*c*, and the bottom offset 624*d* is specified relative to the left boundary, the top boundary, the right boundary, and the bottom boundary of the enhancement layer current picture 620, respectively. In some embodiments, an offset may be indicated by coordinates. For example, an offset can define a position or location using a set of one or more coordinates. In one example, the offset can include a horizontal coordinate and a vertical coordinate. An offset may be positive or negative in value.

Spatial Scalability Support

The following variables may be used in defining the conditions to invoke the resampling process for interlayer reference pictures. According to some embodiments, the variables can be defined as follows:

The variables PicWidthInSamplesL 626 and PicHeightInSamplesL 628 are set equal to the width and height of the current picture in units of luma samples, respectively.

The variables RefLayerPicWidthInSamplesL 616 and RefLayerPicHeightInSamplesL 618 are set equal to the width and height of the decoded reference layer picture in units of luma samples, respectively. Alternatively, the variables RefLayerPicWidthInSamplesL 616 and RefLayerPicHeightInSamplesL 618 are set equal to the width and height of the cropped decoded reference layer picture in units of luma samples, respectively.

The variable ScaledRefLayerLeftOffset 624*a* is defined as the horizontal offset between the upper-left luma sample of a resampled layer picture used for inter-layer prediction and the upper-left luma sample of the current picture in units of luma sample.

The variable ScaledRefLayerTopOffset 624*b* is defined as the vertical offset between the upper-left luma sample of a resampled layer picture used for inter-layer prediction and the upper-left luma sample of the current picture in units of luma sample.

The variable ScaledRefLayerRightOffset 624*c* is defined as the horizontal offset between the bottom-right luma sample of a resampled layer picture used for inter-layer prediction and the bottom-right luma sample of the current picture in units of luma sample.

The variable ScaledRefLayerBottomOffset 624*d* is defined as the vertical offset between the bottom-right luma sample of a resampled layer picture used for inter-layer prediction and the bottom-right luma sample of the current picture in units of luma sample.

The variables ScaledRefLayerPicWidthInSamplesL 630 and ScaledRefLayerPicHeightInSamplesL 632 are defined as follows:

ScaledRefLayerPicWidthInSamplesL=PicWidthInSamplesL−ScaledRefLayerLeftOffset−ScaledRefLayerRightOffset ScaledRefLayerPicHeightInSamplesL=PicHeightInSamplesL−ScaledRefLayerTopOffset−ScaledRefLayerBottomOffset The ScaledRefLayerLeftOffset 624*a*, ScaledRefLayerTopOffset 624*b*, ScaledRefLayerRightOffset 624*c*, and ScaledRefLayerBottomOffset 624*d* may correspond to scaled_ref_layer_left_offset, scaled_ref_layer_top_offset, scaled_ref_layer_right_offset, and scaled_ref_layer_bottom_offset as explained above.

In certain embodiments, the scaled reference layer offsets may be determined at the encoder at the time of deciding which region of the enhancement layer picture to use as input for the reference layer picture. For example, the encoder receives video data input for the enhancement layer and selects a region of the current enhancement layer picture to code as the corresponding reference layer picture. The encoder can set the values of the scaled reference layer offsets to define this region. The offsets can be relative to the current enhancement layer picture. Then, the scaled reference layer offset values can be available to the encoder when the encoder is encoding the current enhancement layer picture based on the reference layer picture (e.g., the reconstructed reference layer picture). The encoder can use the conditions specified below to determine whether to resample the reference layer picture (e.g., reconstructed reference layer picture). Similarly, the decoder can use the same conditions specified below to determine whether to resample the reference layer picture (e.g., reconstructed reference layer picture).

In one embodiment, the condition for checking whether to invoke the resampling process for an interlayer reference picture is defined as follows:

if PicWidthInSamplesL 626 is equal to RefLayerPicWidthInSamplesL 616 and PicHeightInSamplesL 628 is equal to RefLayerPicHeightInSamplesL 618 and the values of ScaledRefLayerLeftOffset 624*a*, ScaledRefLayerTopOffset 624*b*, ScaledRefLayerRightOffset 624*c*, and ScaledRefLayerBottomOffset 624*d* are all equal to 0, then no resampling process is performed, e.g., the reconstructed reference layer picture is added directly to reference picture list of the current picture;

otherwise, the resampling process is invoked to generate the resampled interlayer reference picture.

In this embodiment, if the picture size of the current picture and the picture size of the interlayer reference picture are the same and all the scaled reference layer offsets are equal to 0, then the interlayer reference picture can be added to the reference picture list of the current picture without resampling the interlayer reference picture. Otherwise, the interlayer reference picture is resampled and then the resampled interlayer reference picture is added to the reference picture list of the current picture. By checking the picture size and the scaled reference layer offsets, the techniques can check whether the current picture and the interlayer reference picture have the same spatial ratio and picture size.

In another embodiment, the condition for checking whether to invoke the resampling process for an interlayer reference picture is defined as follows:

if ScaledRefLayerPicWidthInSamplesL 630 is equal to RefLayerPicWidthInSamplesL 616 and ScaledRefLayerPicHeightInSamplesL 632 is equal to RefLayerPicHeightInSamplesL 618 and the values of ScaledRefLayerLeftOffset 624*a*, ScaledRefLayerTopOffset 624*b*, ScaledRefLayerRightOffset 624*c*, and ScaledRefLayerBottomOffset 624*d* are all equal to 0, then no resampling process is performed, e.g., the reconstructed reference layer picture is added directly to reference picture list of the current picture;

otherwise, the resampling process is invoked to generate the resampled interlayer reference picture.

In this embodiment, if the picture size of the current picture and the picture size of the scaled interlayer reference picture are the same and all the scaled reference layer offsets are equal to 0, then the interlayer reference picture can be added to the reference picture list of the current picture without resampling the interlayer reference picture. Otherwise, the interlayer reference picture is resampled and then the resampled interlayer reference picture is added to the reference picture list of the current picture. As explained above, by checking the picture size and the scaled reference layer offsets, the techniques can check whether the current picture and the interlayer reference picture have the same spatial ratio and picture size.

Support for Additional Scalability Types

As mentioned above, the resampling process is used to generate an interlayer reference picture that has the same picture format as the current picture. For the spatial scalability case described above, only spatial resolution is taken into account. However, the general picture format information includes more information, such as bit depth of picture sample and chroma color format. Therefore, a certain kind of resampling process may need to be invoked when such information of the current picture is different from such information of the reference layer pictures. For example, the sample values of a reference layer may be represented by 8 bits of data, resulting in a range of values from 0 to 255; the sample values of an enhancement layer may be represented by 10 bits of data, resulting in a range of values from 0 to 1023. As another example, the reference layer picture may have YUV420 chroma color format, and the enhancement layer may have YUV444 chroma color format. In these examples, based on differences in bit depths and/or chroma color formats between the reference layer and the enhancement layer, a resampling process may be needed to support bit depth scalability and chroma color format scalability in SHVC.

The following variables may be used in defining the conditions to invoke the resampling process for interlayer reference pictures. According to some embodiments, the variables can be defined as follows:

The variables BitDepthY and BitDepthC are the bit depth of the luma component and chroma component, respectively, of the current picture.

The variables RefLayerBitDepthY and RefLayerBitDepthC are the bit depth of the luma component and chroma component, respectively, of the interlayer reference picture.

The variable chroma_format_idc is the chroma format of the current picture and RefLayer_chroma_format_idc is the chroma format of the reference layer picture.

In one embodiment, the condition for checking whether to invoke the resampling process for an interlayer reference picture is defined as follows:

if PicWidthInSamplesL 626 is equal to RefLayerPicWidthInSamplesL 616, and PicHeightInSamplesL 628 is equal to RefLayerPicHeightInSamplesL 618, and the values of ScaledRefLayerLeftOffset 624*a*, ScaledRefLayerTopOffset 624*b*, ScaledRefLayerRightOffset 624*c*, and ScaledRefLayerBottomOffset 624*d* are all equal to 0, and BitDepthY is equal to RefLayerBitDepthY, and BitDepthC is equal to RefLayerBitDepthC, and chroma_format_idc is equal to RefLayer_chroma_format_idc, then no resampling process is performed, e.g., the reconstructed reference layer picture is added directly to reference picture list of the current picture;

otherwise, the resampling process is invoked to generate the resampled interlayer reference picture.

In this embodiment, if the picture size of the current picture and the interlayer reference picture are the same, all the scaled reference layer offsets are equal to 0, the luma bit depth and chroma bit depth of the current picture and the interlayer reference picture are the same, and the chroma format of the current picture and the interlayer reference picture are the same, then the interlayer reference picture can be added to the reference picture list of the current picture without resampling the interlayer reference picture. Otherwise, the interlayer reference picture is resampled and then the resampled interlayer reference picture is added to the reference picture list of the current picture. As explained above, by checking the picture size and the scaled reference layer offsets, the techniques can check whether the current picture and the interlayer reference picture have the same spatial ratio and picture size.

By checking whether the luma and chroma bit depth are the same and the chroma format is the same, the techniques can resample the interlayer reference picture as appropriate when the luma and chroma bit depth and/or the chroma format are different.

Method of Determining Whether to Resample an Interlayer Reference Picture

Figure 7:
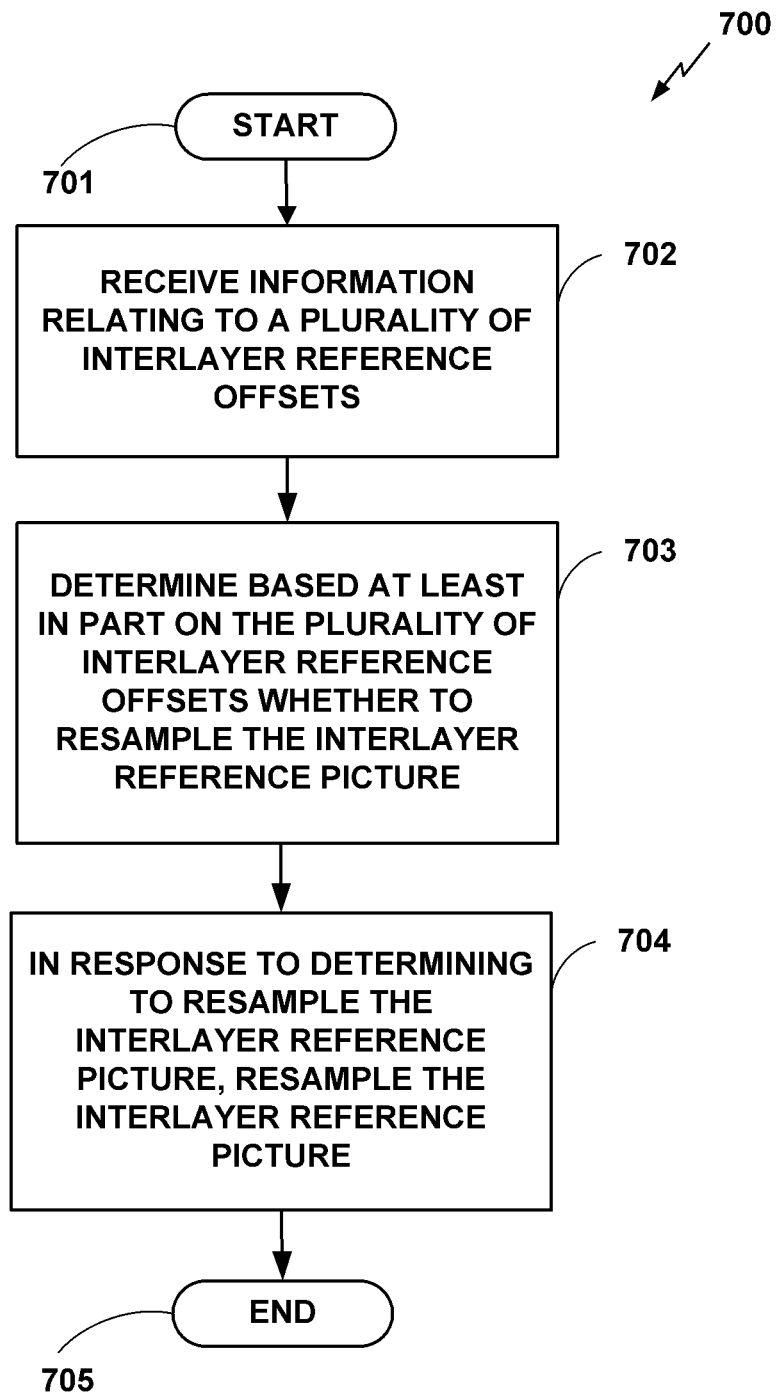
FIG. 7 is a flowchart illustrating a method for determining whether to resample an interlayer reference picture, according to aspects of this disclosure.

FIG. 7 is a flowchart illustrating an example method for determining whether to resample an interlayer reference picture, according to aspects of this disclosure. The process 700 may be performed by an encoder (e.g., the encoder as shown in FIG. 2A, 2B, etc.), a decoder (e.g., the decoder as shown in FIG. 3A, 3B, etc.), or any other component, depending on the embodiment. The blocks of the process 700 are described with respect to the decoder 31 in FIG. 3B, but the process 700 may be performed by other components, such as an encoder, as mentioned above. The layer 1 video decoder 30B of the decoder 31 and/or the layer 0 decoder 30A of the decoder 31 may perform the process 700, depending on the embodiment. All embodiments described with respect to FIG. 7 may be implemented separately, or in combination with one another. Certain details relating to the process 700 are explained above, e.g., with respect to FIG. 6.

The process 700 starts at block 701. The decoder 31 can include a memory (e.g., reference frame memory 82) for storing video information associated with an interlayer reference picture for the current picture to be decoded. The current picture can be from the current layer, and the interlayer reference picture can be from a reference layer of the current layer. In some embodiments, the current layer is referred to as the enhancement layer, and the reference layer is referred to as the base layer.

At block 702, the decoder 31 receives information relating to a plurality of interlayer reference offsets for defining a region of a resampled version of the interlayer reference picture used to generate a prediction of the current picture. The decoder 31 can receive the information in a bistream and decode one or more syntax elements to obtain information relating to the plurality of interlayer reference offsets. If information relating to the plurality of interlayer reference offsets of an interlayer reference picture is not present in the bitstream, the decoder 31 can infer that each of the plurality of interlayer reference offsets is equal to 0. For example, the reference picture may be one that does not need resampling and/or the reference picture may use the entire interlayer reference picture in generating a prediction for the current picture. The plurality of interlayer reference offsets can be defined in terms of coordinates of the resampled version of the interlayer reference picture. However, as explained above, certain interlayer reference pictures may not have a resampled version since resampling may not be necessary. In such cases, the plurality of interlayer reference offsets may not be signaled or inferred to be 0.

The plurality of interlayer reference offsets can include a left offset, a top offset, a right offset, and a bottom offset that are each specified relative to the current picture. The left offset, the top offset, the right offset, and the bottom offset can correspond to scaled_ref_layer_left_offset, scaled_ref_layer_top_offset, scaled_ref_layer_right_offset, and scaled_ref_layer_bottom_offset, respectively.

In one embodiment, the left offset is a horizontal offset between an upper-left luma sample of the resampled version of the interlayer reference picture and an upper-left luma sample of the current picture. The top offset is a vertical offset between the upper-left luma sample of the resampled version of the interlayer reference picture and the upper-left luma sample of the current picture. The right offset is a horizontal offset between a bottom-right luma sample of the resampled version of the interlayer reference picture and a bottom-right luma sample of the current picture. The bottom offset is a vertical offset between the bottom-right luma sample of the resampled version of the interlayer reference picture and the bottom-right luma sample of the current picture. Each offset can be defined in units of luma samples.

At block 703, the decoder 31 determines based at least in part on the plurality of interlayer reference offsets whether to resample the interlayer reference picture. The decoder 31 can determine based on various criteria, including the plurality of interlayer reference offsets, whether to resample the interlayer reference picture or not. The resampling process can include upsampling, downsampling, bit-shifting, cropping, and/or padding the interlayer reference picture, or any combination thereof. In some embodiments, the decoder 31 may additionally or alternatively consider one or more types information associated with the picture format of the interlayer reference picture in determining whether to resample the interlayer reference picture. The picture format can include various types of information, including spatial resolution, chroma format, bit depth, etc.

In certain embodiments, the decoder 31 considers the spatial resolution of the current picture and the interlayer reference picture (or the upsampled or resampled version of the interlayer reference picture). In one embodiment, the decoder 31 determines whether to resample the interlayer reference picture by determining conditions that include:
   whether the width of the current picture and the width of the interlayer reference picture are equal
   whether the height of the current picture and the height of the interlayer reference picture are equal, and
   whether the left offset, the top offset, the right offset, and the bottom offset are each equal to 0

If all conditions are true, the decoder 31 determines that the interlayer reference picture should not be resampled. If at least one of the conditions is not true, the decoder 31 determines that the interlayer reference picture should be resampled. The decoder 31 checks the above conditions in order to determine whether the interlayer reference picture should be resampled or not. The width of the current picture, the height of the current picture, the width of the interlayer reference picture, and the height of the interlayer reference picture can be defined in units of luma samples.

In another embodiment, the decoder 31 determines whether to resample the interlayer reference picture by determining conditions that include:
   whether the width of the interlayer reference picture and the width of the resampled version of the interlayer reference picture are equal, wherein the width of the resampled version of the interlayer reference picture is obtained by subtracting the left offset and the right offset from the width of the current picture,
   whether the height of the interlayer reference picture and the height of the resampled version of the interlayer reference picture are equal, wherein the height of the resampled version of the interlayer reference picture is obtained by subtracting the top offset and the bottom offset from the height of the current picture, and
   whether the left offset, the top offset, the right offset, and the bottom offset are each equal to 0

If all conditions are true, the decoder 31 determines that the interlayer reference picture should not be resampled. If at least one of the conditions is not true, the decoder 31 determines that the interlayer reference picture should be resampled. The decoder 31 checks the above conditions in order to determine whether the interlayer reference picture should be resampled or not. The width of the current picture, the height of the current picture, the width of the resampled version of the interlayer reference picture, and the height of the resampled version of the interlayer reference picture can be defined in units of luma samples.

In some embodiments, the decoder 31 considers the chroma format and the bit depth of the current picture and the interlayer reference picture, along with the spatial resolution of the current picture and the interlayer reference picture (or the upsampled or resampled version of the interlayer reference picture). In one embodiment, the decoder 31 determines whether to resample the interlayer reference picture by determining conditions that include:
   whether the width of the current picture and the width of interlayer reference picture are equal
   whether the height of the current picture and the height of the interlayer reference picture are equal
   whether the left offset, the top offset, the right offset, and the bottom offset are each equal to 0
   whether the bit depth of the luma component of the current picture and the bit depth of the luma component of the interlayer reference picture are equal
   whether the bit depth of the chroma component of the current picture and the bit depth of the chroma component of the interlayer reference picture are equal, and
   whether the chroma format of the current picture and the chroma format of the interlayer reference picture are equal If all conditions are true, the decoder 31 determines that the interlayer reference picture should not be resampled. If at least one of the conditions is not true, the decoder 31 determines that the interlayer reference picture should be resampled. The decoder 31 checks the above conditions in order to determine whether the interlayer reference picture should be resampled or not. The width of the current picture, the height of the current picture, the width of the interlayer reference picture, and the height of the interlayer reference picture can be defined in units of luma samples.

At block 704, the decoder 31 resamples the interlayer reference picture, in response to determining that the interlayer reference picture should be resampled. For example, the upsampling unit 92 of the decoder 31 can perform the resampling. The decoder 31 can add the resampled interlayer reference picture to the reference picture list of the current picture. If the decoder 31 determines that the interlayer reference picture should not be resampled, decoder 31 can add the interlayer reference picture to the reference picture list of the current picture without resampling the interlayer reference picture. The decoder 31 can generate the prediction unit (PU) of the current picture based on the interlayer reference picture in the reference picture list. The decoder 31 then can reconstruct the current picture based on the prediction unit. The process 700 ends at block 705.

By checking the various conditions described in different embodiments above, the decoder 31 can resample the interlayer reference picture appropriately when resampling is needed. The plurality of interlayer reference offsets can be considered in the determining of whether to resample the interlayer reference picture such that the interlayer reference picture can be resampled when only a region of the interlayer reference picture (or the upsampled or resampled interlayer reference picture) is used in prediction of the current picture.

These techniques may be used in high-level syntax only SHVC. In high-level syntax only SHVC, the information relating to the plurality of interlayer reference offsets may be specified at a slice level or above. Blocks may be added and/or omitted in the process 700, depending on the embodiment, and blocks of the process 700 may be performed in different orders, depending on the embodiment.

Any features and/or embodiments described with respect to resampling in this disclosure may be implemented separately or in any combination thereof. For example, any features and/or embodiments described in connection with FIG. 6 may be implemented in any combination with any features and/or embodiments described in connection with FIG. 7, and vice versa.

Motion Mapping Process

As discussed above, a resampling process is invoked when the picture format information of the base layer and enhancement layer are different. When a resampling process is not invoked, the reference layer reconstructed picture is directly used as inter-layer reference picture. However, even when the picture format information of the reference layer picture and the current enhancement layer are identical, there could still be problems if the reconstructed reference layer picture is directly used as reference picture for the enhancement layer. This is because when the coding tree block (CTB) size of the reference layer picture and the enhancement layer picture are different and there are multiple slices existing in the reference layer picture, the slice partition of the inter-layer reference picture may cross the enhancement layer CTB boundary. This could introduce problems when the reconstructed reference layer picture is used as a collocated picture for temporal motion vector predictor (TMVP) derivation to enable inter-layer reference picture.

One method to solve this problem is to impose a restriction that the interlayer reference picture cannot be used as collocated picture as described in U.S. Provisional Application No. 61/857,165, filed Jul. 22, 2013, and U.S. Provisional Application No. 61/886,997, filed Oct. 14, 2013, each of which is incorporated by reference in its entirety.

In another embodiment, it is proposed to invoke a certain resampling process for this case. The resampling process may include slice boundary adjustment, or other processes which can solve such problem, such as those described in U.S. Provisional Application No. 61/857,227, filed Jul. 22, 2013, which is incorporated by reference in its entirety.

Therefore, in addition to the conditions defined above, when the CTB size of the reference layer picture and the CTB size of the current enhancement layer is different, a resampling process is invoked to generate the interlayer reference picture with the reconstructed reference layer picture as input.

Alternatively or in addition to the conditions defined above, when the CTB size of the reference layer picture and the CTB size of the current enhancement layer are different, and there are multiple slices in the reference layer picture, a resampling process is invoked to generate the interlayer reference picture with the reconstructed reference layer picture as input.

Alternatively or in addition to the conditions defined above, when the CTB size of the reference layer picture and CTB size of the current enhancement layer is different, and there are multiple slices in the reference layer picture, and the slice type and the reference picture lists of the multiple slices are not identical, a resampling process is invoked to generate the interlayer reference picture with the reconstructed reference layer picture as input.

Terminology

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device 12 to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described. These and other embodiments are within the scope of the following claims.

Various embodiments of the invention have been described. These and other embodiments are within the scope of the following claims.

What is claimed is:

1. An apparatus for coding video information, the apparatus comprising:
a memory configured to store video information associated with an interlayer reference picture for a current picture to be coded; and
a processor operationally coupled to the memory and configured to:
receive information relating to a plurality of interlayer reference offsets that are configured to define a region of the interlayer reference picture, wherein the region is used to generate a prediction of the current picture, and wherein the plurality of interlayer reference offsets include a left offset, a top offset, a right offset, and a bottom offset relative to the current picture, wherein:
the left offset is a horizontal offset between an upper-left luma sample of the interlayer reference picture and an upper-left luma sample of the current picture;
the top offset is a vertical offset between the upper-left luma sample of the interlayer reference picture and the upper-left luma sample of the current picture;
the right offset is a horizontal offset between a bottom-right luma sample of the interlayer reference picture and a bottom-right luma sample of the current picture; and
the bottom offset is a vertical offset between the bottom-right luma sample of the interlayer reference picture and the bottom-right luma sample of the current picture,
wherein each offset is defined in units of luma samples;
determine that:
a width of the current picture and a width of the interlayer reference picture are equal;
a height of the current picture and a height of the interlayer reference picture are equal; and
the left offset, the top offset, the right offset, and the bottom offset are each equal to 0; and
based on the determination that the width of the current picture and the width of the interlayer reference picture are equal, the height of the current picture and the height of the interlayer reference picture are equal, and the left offset, the top offset, the right offset, and the bottom offset are each equal to 0, not resample the interlayer reference picture.

2. The apparatus of claim 1, wherein the processor is further configured to determine whether to resample the interlayer reference picture based on the plurality of interlayer reference offsets and a picture format of the interlayer reference picture, wherein the picture format includes one or more of: spatial resolution, chroma format, or bit depth.

3. The apparatus of claim 1, wherein the processor is further configured to determine whether to resample the interlayer reference picture based at least in part on:

whether a bit depth of a luma component of the current picture and a bit depth of a luma component of the interlayer reference picture are equal;

whether a bit depth of a chroma component of the current picture and a bit depth of a chroma component of the interlayer reference picture are equal; and whether a chroma format of the current picture and a chroma format of the interlayer reference picture are equal.

4. The apparatus of claim 3, wherein the processor is further configured to determine that the interlayer reference picture should not be resampled based on the bit depth of the luma component of the current picture and the bit depth of the luma component of the interlayer reference picture being equal, the bit depth of the chroma component of the current picture and the bit depth of the chroma component of the interlayer reference picture being equal, and the chroma format of the current picture and the chroma format of the interlayer reference picture being equal.

5. The apparatus of claim 3, wherein the processor is further configured to determine that the interlayer reference picture should be resampled based on the bit depth of the luma component of the current picture and the bit depth of the luma component of the interlayer reference picture not being equal, the bit depth of the chroma component of the current picture and the bit depth of the chroma component of the interlayer reference picture not being equal, or the chroma format of the current picture and the chroma format of the interlayer reference picture not being equal.

6. The apparatus of claim 1, wherein the processor is further configured to perform one or more of: upsampling, downsampling, bit-shifting, cropping, or padding the interlayer reference picture.

7. The apparatus of claim 1, wherein the processor is further configured to add the resampled interlayer reference picture to a reference picture list of the current picture.

8. The apparatus of claim 1, wherein the processor is further configured to, in response to a determination that the interlayer reference picture should not be resampled, add the interlayer reference picture to a reference picture list of the current picture without resampling the interlayer reference picture.

9. The apparatus of claim 1, wherein the apparatus is selected from a group consisting of: a desktop computer, a notebook computer, a laptop computer, a tablet computer, a set-top box, a telephone handset, a smart phone, a smart pad, a television, a camera, a display device, a digital media player, a video gaming console, and a video streaming device.

10. A method of coding video information, the method comprising:

storing video information associated with an interlayer reference picture for a current picture to be coded;

receiving information relating to a plurality of interlayer reference offsets that are configured to define a region of the interlayer reference picture, wherein the region is used to generate a prediction of the current picture, and wherein the plurality of interlayer reference offsets include a left offset, a top offset, a right offset, and a bottom offset relative to the current picture, wherein the left offset is a horizontal offset between an upper-left luma sample of the interlayer reference picture and an upper-left luma sample of the current picture;

the top offset is a vertical offset between the upper-left luma sample of the interlayer reference picture and the upper-left luma sample of the current picture;

the right offset is a horizontal offset between a bottom-right luma sample of the interlayer reference picture and a bottom-right luma sample of the current picture; and the bottom offset is a vertical offset between the bottom-right luma sample of the interlayer reference picture and the bottom-right luma sample of the current picture, wherein each offset is defined in units of luma samples;

determining that:

a width of the current picture and a width of the interlayer reference picture are equal;

a height of the current picture and a height of the interlayer reference picture are equal; and the left offset, the top offset, the right offset, and the bottom offset are each equal to 0; and based on determining that the width of the current picture and the width of the interlayer reference picture are equal, the height of the current picture and the height of the interlayer reference picture are equal, and the left offset, the top offset, the right offset, and the bottom offset are each equal to 0, not resampling the interlayer reference picture.

11. The method of claim 10, further comprising determining whether to resample the interlayer reference picture based on the plurality of interlayer reference offsets and a picture format of the interlayer reference picture, wherein the picture format includes one or more of: spatial resolution, chroma format, or bit depth.

12. The method of claim 10, further comprising determining whether to resample the interlayer reference picture based at least in part on:

whether a bit depth of a luma component of the current picture and a bit depth of a luma component of the interlayer reference picture are equal;

whether a bit depth of a chroma component of the current picture and a bit depth of a chroma component of the interlayer reference picture are equal; and whether a chroma format of the current picture and a chroma format of the interlayer reference picture are equal.

13. The method of claim 12, further comprising determining that the interlayer reference picture should not be resampled based on the bit depth of the luma component of the current picture and the bit depth of the luma component of the interlayer reference picture being equal, the bit depth of the chroma component of the current picture and the bit depth of the chroma component of the interlayer reference picture being equal, and the chroma format of the current picture and the chroma format of the interlayer reference picture being equal.

14. The method of claim 12, further comprising determining that the interlayer reference picture should be resampled based on the bit depth of the luma component of the current picture and the bit depth of the luma component of the interlayer reference picture not being equal, the bit depth of the chroma component of the current picture and the bit depth of the chroma component of the interlayer reference picture not being equal, or the chroma format of the current picture and the chroma format of the interlayer reference picture not being equal.

15. The method of claim 10, further comprising performing one or more of: upsampling, downsampling, bit-shifting, cropping, or padding the interlayer reference picture.

16. A non-transitory computer readable medium comprising instructions that when executed on a processor comprising computer hardware cause the processor to:

store video information associated with an interlayer reference picture for a current picture to be coded;

receive information relating to a plurality of interlayer reference offsets that are configured to define a region of the interlayer reference picture, wherein the region is used to generate a prediction of the current picture, and wherein the plurality of interlayer reference offsets include a left offset, a top offset, a right offset, and a bottom offset relative to the current picture, wherein:

the left offset is a horizontal offset between an upper-left luma sample of the interlayer reference picture and an upper-left luma sample of the current picture;

the top offset is a vertical offset between the upper-left luma sample of the interlayer reference picture and the upper-left luma sample of the current picture;

the right offset is a horizontal offset between a bottom-right luma sample of the interlayer reference picture and a bottom-right luma sample of the current picture; and the bottom offset is a vertical offset between the bottom-right luma sample of the interlayer reference picture and the bottom-right luma sample of the current picture, wherein each offset is defined in units of luma samples;

determine that:
  a width of the current picture and a width of the interlayer reference picture are equal;
  a height of the current picture and a height of the interlayer reference picture are equal; and
  the left offset, the top offset, the right offset, and the bottom offset are each equal to 0; and based on the determination that the width of the current picture and the width of the interlayer reference picture are equal, the height of the current picture and the height of the interlayer reference picture are equal, and the left offset, the top offset, the right offset, and the bottom offset are each equal to 0, not resampling the interlayer reference picture.

17. The non-transitory computer readable medium of claim 16, further comprising instructions that cause the processor to determine whether to resample the interlayer reference picture based at least in part on:

whether a bit depth of a luma component of the current picture and a bit depth of a luma component of the interlayer reference picture are equal;

whether a bit depth of a chroma component of the current picture and a bit depth of a chroma component of the interlayer reference picture are equal; and whether a chroma format of the current picture and a chroma format of the interlayer reference picture are equal.

18. An apparatus for coding video information, the apparatus comprising:

means for storing video information associated with an interlayer reference picture for a current picture to be coded;

means for receiving information relating to a plurality of interlayer reference offsets that are configured to define a region of the interlayer reference picture, wherein the region is used to generate a prediction of the current picture, and wherein the plurality of interlayer reference offsets include a left offset, a top offset, a right offset, and a bottom offset relative to the current picture, wherein:

the left offset is a horizontal offset between an upper-left luma sample of the interlayer reference picture and an upper-left luma sample of the current picture;

the top offset is a vertical offset between the upper-left luma sample of the interlayer reference picture and the upper-left luma sample of the current picture;

the right offset is a horizontal offset between a bottom-right luma sample of the interlayer reference picture and a bottom-right luma sample of the current picture; and the bottom offset is a vertical offset between the bottom-right luma sample of the interlayer reference picture and the bottom-right luma sample of the current picture, wherein each offset is defined in units of luma samples;

means for determining that:
  a width of the current picture and a width of the interlayer reference picture are equal;
  a height of the current picture and a height of the interlayer reference picture are equal; and
  the left offset, the top offset, the right offset, and the bottom offset are each equal to 0; and means for not resampling the interlayer reference picture based on the determination that the width of the current picture and the width of the interlayer reference picture are equal, the height of the current picture and the height of the interlayer reference picture are equal, and the left offset, the top offset, the right offset, and the bottom offset are each equal to 0.

19. The apparatus of claim 18, further comprising means for determining whether to resample the interlayer reference picture based at least in part on:

whether a bit depth of a luma component of the current picture and a bit depth of a luma component of the interlayer reference picture are equal;

whether a bit depth of a chroma component of the current picture and a bit depth of a chroma component of the interlayer reference picture are equal; and whether a chroma format of the current picture and a chroma format of the interlayer reference picture are equal.

* * * * *